(12) United States Patent
Moroni et al.

(10) Patent No.: US 9,950,696 B2
(45) Date of Patent: Apr. 24, 2018

(54) PARKING BRAKE

(71) Applicant: Quadro Vehicles S.A., Lugano (CH)

(72) Inventors: Marco Moroni, Marnate (IT);
Riccardo Marabese, Porto Valtravaglia (IT)

(73) Assignee: QUADRO VEHICLES S.A., Lugano (CH)

( * ) Notice: Subject to any disclaimer, the term of this patent is extended or adjusted under 35 U.S.C. 154(b) by 0 days.

(21) Appl. No.: 15/023,720

(22) PCT Filed: Sep. 23, 2014

(86) PCT No.: PCT/IB2014/064757
§ 371 (c)(1),
(2) Date: Mar. 22, 2016

(87) PCT Pub. No.: WO2015/040600
PCT Pub. Date: Mar. 26, 2015

(65) Prior Publication Data
US 2016/0229381 A1 Aug. 11, 2016

(30) Foreign Application Priority Data

Sep. 23, 2013 (IT) .............................. MI2013A1559

(51) Int. Cl.
B60T 1/00 (2006.01)
B60T 1/06 (2006.01)
F16D 55/225 (2006.01)

(52) U.S. Cl.
CPC .............. B60T 1/005 (2013.01); B60T 1/062 (2013.01); F16D 55/225 (2013.01)

(58) Field of Classification Search
CPC ........... B60T 1/005; B60T 1/062; B60T 1/065
USPC ..................................................... 188/31, 265
See application file for complete search history.

(56) References Cited

U.S. PATENT DOCUMENTS

| 1,523,304 A | * | 1/1925 | Spiro | ...................... F16D 55/39 188/31 |
| 2,974,752 A | * | 3/1961 | Howard | .............. F16H 63/3475 188/265 |
| 3,952,838 A | * | 4/1976 | Osten | ...................... B60T 1/005 188/31 |

(Continued)

FOREIGN PATENT DOCUMENTS

| EP | 0855792 A2 | 12/1998 |
| EP | 0950589 A2 | 10/1999 |

(Continued)

OTHER PUBLICATIONS

International Search Report and Written Opinion for PCT/IB2014/064757, dated Jul. 21, 2015, 10 pages.

Primary Examiner — Melanie Torres Williams
(74) Attorney, Agent, or Firm — Abelman, Frayne & Schwab

(57) ABSTRACT

A parking brake (1) comprises a disc (2) coaxially fixable to the wheel of a vehicle; locking means (4) associated with the disc (2), the disc (2) has at least a seat (3) formed on an edge (2a); locking means (4) comprising a pin (5) associated with the disc (2) and switchable between a locking configuration, in which the pin (5) interferes with the seat (3), and an unlocking configuration in which the pin (5) is removed from the seat (3).

8 Claims, 5 Drawing Sheets

(56) References Cited

U.S. PATENT DOCUMENTS

| | | | | |
|---|---|---|---|---|
| 4,907,681 A | * | 3/1990 | Kuusik | B60T 1/005 188/31 |
| 4,934,490 A | | 6/1990 | Chang | |
| 5,269,195 A | * | 12/1993 | Kitagawara | B60T 1/005 188/69 |
| 6,250,433 B1 | | 6/2001 | Sealine | |
| 8,544,355 B2 | * | 10/2013 | Burgardt | F16H 63/3416 188/31 |
| 8,631,916 B2 | * | 1/2014 | Mazzucchi | B60K 23/00 188/265 |
| 2001/0042669 A1 | * | 11/2001 | Arakawa | B60T 1/005 188/31 |
| 2002/0020589 A1 | * | 2/2002 | Tagami | B60T 1/005 188/31 |
| 2006/0151259 A1 | * | 7/2006 | Tomasi | B62B 9/08 188/31 |
| 2008/0264740 A1 | * | 10/2008 | Usui | F16D 65/18 188/265 |

FOREIGN PATENT DOCUMENTS

| | | |
|---|---|---|
| WO | 91008125 A1 | 6/1991 |
| WO | 03085280 A1 | 10/2003 |

\* cited by examiner

PARKING BRAKE

CLAIM FOR PRIORITY

This application claims priority to Italian Patent Application No. MI2013A001559 filed on 23 Sep. 2013.

FIELD OF THE INVENTION

The present invention relates to a parking brake, in particular for vehicles. Even more preferably, the present invention relates to parking brakes for motor vehicles.

The parking brake according to the present invention is applicable in particular to motor vehicles of any type, in particular racing and road motorcycles, motorscooters, mopeds and more. More generally, the parking brake according to the invention may be employed with all vehicles with wheels, or in any case capable of using a disc braking system.

STATE OF THE ART

In the state of the art, a parking brake comprises a disc coaxially fixable to the wheel of a vehicle. Usually, such a disc is the same that is used in the "service" braking system, if of disc type. A calliper comprising a pair of jaws is associated with the disc, and may clamp thereon so as to lock it between the jaws. In particular, the calliper comprises a pair of pads, each located on a respective jaw. In other words, the calliper operates similarly to the calliper of the braking system.

The parking brake further comprises a control lever connected to the calliper by means of a mechanical cable or of a hydraulic circuit. The lever may switch from a disabled position, in which the running of the vehicle is allowed, to an enabled position, in which the parking brake blocks the mentioned vehicle. Once the lever is moved into the enabled position, the calliper jaws close. Such jaws clamp on the disc and, accordingly, lock the wheel of the vehicle connected thereto.

Disadvantageously, a progressive decrease of the braking action occurs in this type of parking brakes. Such a braking action is indeed based on the friction between the jaws of the callipers (in particular, of the pads located thereon) and the surface of the disc. As time passes, the pads are worn, followed by a decrease in the braking action. Adjustments are therefore required at predetermined time intervals to keep the brake efficient.

The pads wear out during the running of the vehicle because when they are resting, they graze the disc and wear accordingly: it is not incorrect to state that a parking calliper reduces vehicle performance and increases fuel consumption.

A further drawback affecting parking brakes of known type consists of the fact that the braking action given by the jaws is not independent from the action, in particular of the force, exerted by the user on the lever.

Furthermore, the brake of known type is cumbersome and heavy, which is disadvantageous for vehicle performance due to the burdening of the unsprung masses: the unsprung mass is considered deleterious, given that it confers an inertia to the response of the suspension and shock apparatus of the vehicle, which may result in decreased road-holding given that such an inertia may also lead to the separation of the wheel from the ground. For these reasons, one goal is to minimize the unsprung mass as much as possible.

SUMMARY OF THE INVENTION

Within this context, the technical task at the basis of the present invention is to propose a parking brake which overcomes the above-mentioned drawbacks of the known art.

In particular, it is the object of the present invention to make a parking brake available with minimum maintenance requirements.

A further object of the present invention is to propose a sturdier parking brake.

The technical task explained and the objects specified are substantially achieved by a parking brake comprising the technical features explained in one or more of the appended claims.

In particular, the parking brake according to the invention comprises a pin that can be inserted into a seat formed on the edge of the disc. Such a pin is switchable between a locking configuration, in which it interferes with the seat to prevent the rotation of the disc, and an unlocking configuration, in which it is removed from the seat to allow the rotation of the disc.

Thereby, it is possible to prevent using the calliper on the parking brakes of known type, thus limiting the need for maintenance.

Furthermore, since the braking action is given by the interference of the pin with the disc, there is no need for the actuation mechanism to exert significant force as instead occurs in the case of callipers, which require clamping on the disc and perform their function by using the force of friction. An actuation of this type makes the brake sturdier, simpler, lighter and less cumbersome; the absence of frictions during running increases the performance of the vehicle and reduces the fuel consumption thereof.

BRIEF DESCRIPTION OF THE FIGURES

Further features and advantages of the present invention will become more apparent from the indicative, and therefore non-limiting, description of a preferred, but not exclusive, embodiment of a parking brake, as disclosed in the accompanying drawings, in which.

DETAILED DESCRIPTION OF THE INVENTION

Figure 1:
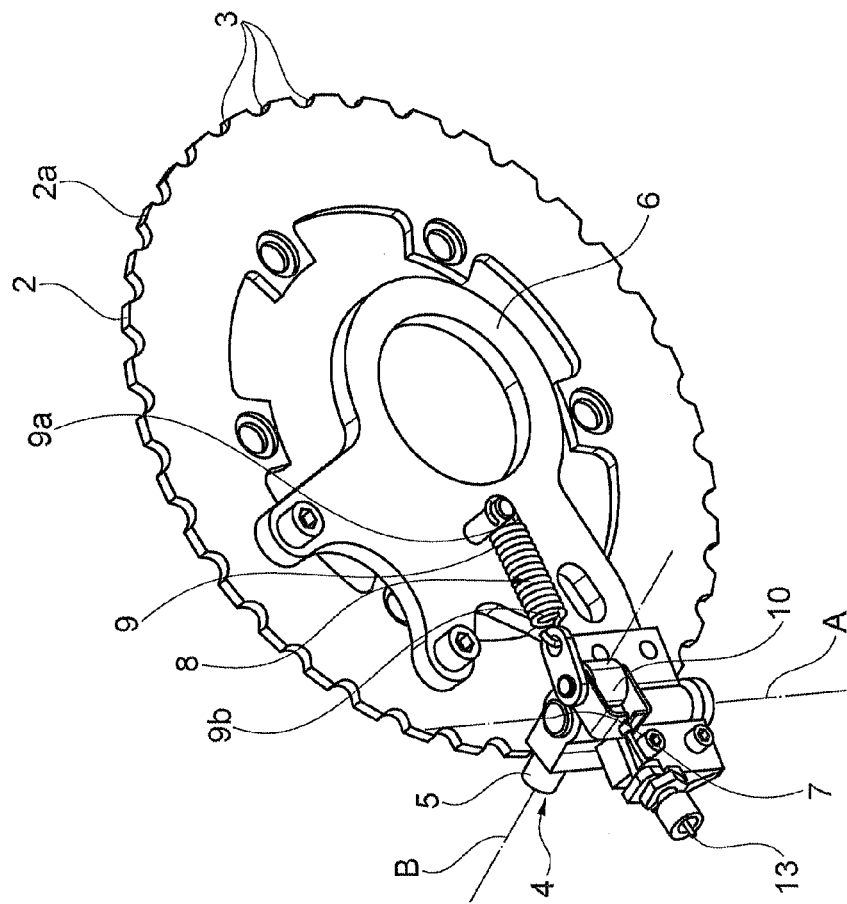
FIG. 1 is a perspective view of a parking brake according to the present invention.
Figure 1:
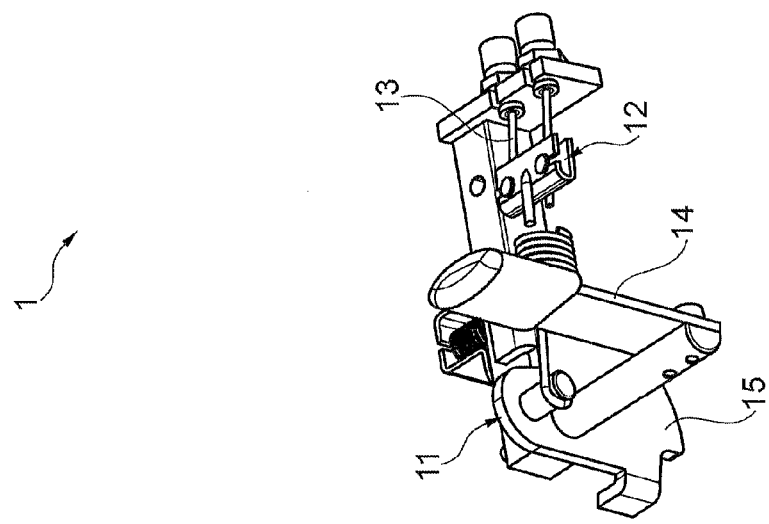

With reference to the accompanying drawings, numeral 1 indicates a parking brake according to the present invention.

Brake 1 comprises a disc 2. Such a disc 2 is coaxially fixable to the wheel of a vehicle, as occurs for braking systems. Advantageously, disc 2 may also serve as a service brake.

In particular, disc 2 has an edge 2a, on which there is formed at least a seat 3. In the preferred embodiment, disc 2 has a plurality of seats 3 formed on the mentioned edge 2a. Preferably, the seats 3 are angularly equally spaced with respect to the centre of disc 2.

In greater detail, edge 2a of disc 2 has a profile with a plurality of ridges and valleys. Each valley defines a respective seat 3. In the preferred embodiment, the valleys are portions of a circumference. In alternative embodiments, edge 2a and/or pin 5 may have other profiles, e.g. sinusoidal.

Brake 1 comprises locking means 4 associated with disc 2. Such locking means 4 serve the purpose of preventing the rotation of disc 2.

Figure 2A:
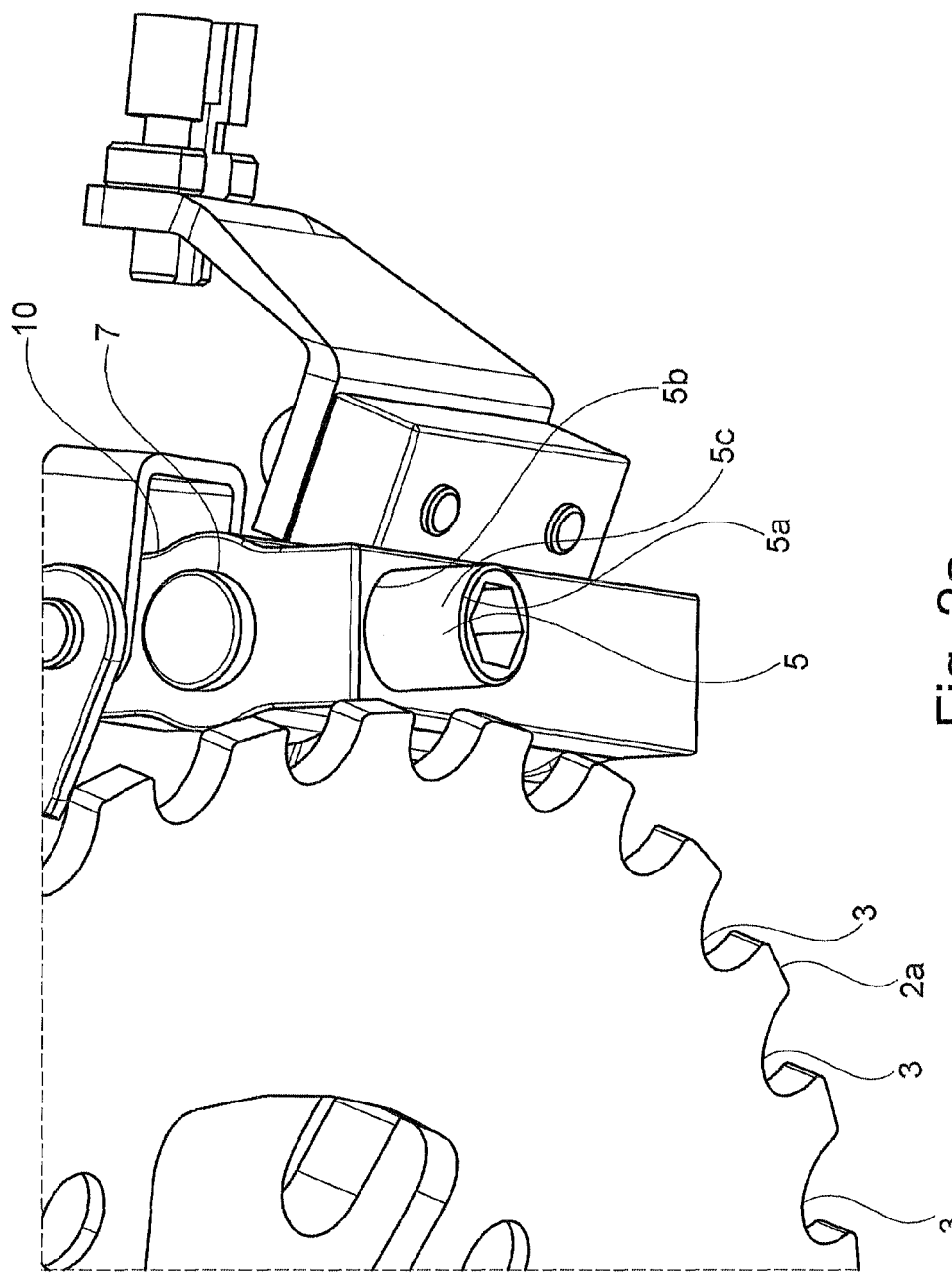
FIGS. 2a and 2b are perspective views of a detail of the parking brake in FIG. 1, in a non operating configuration and in an operating configuration respectively.
Figure 2B:
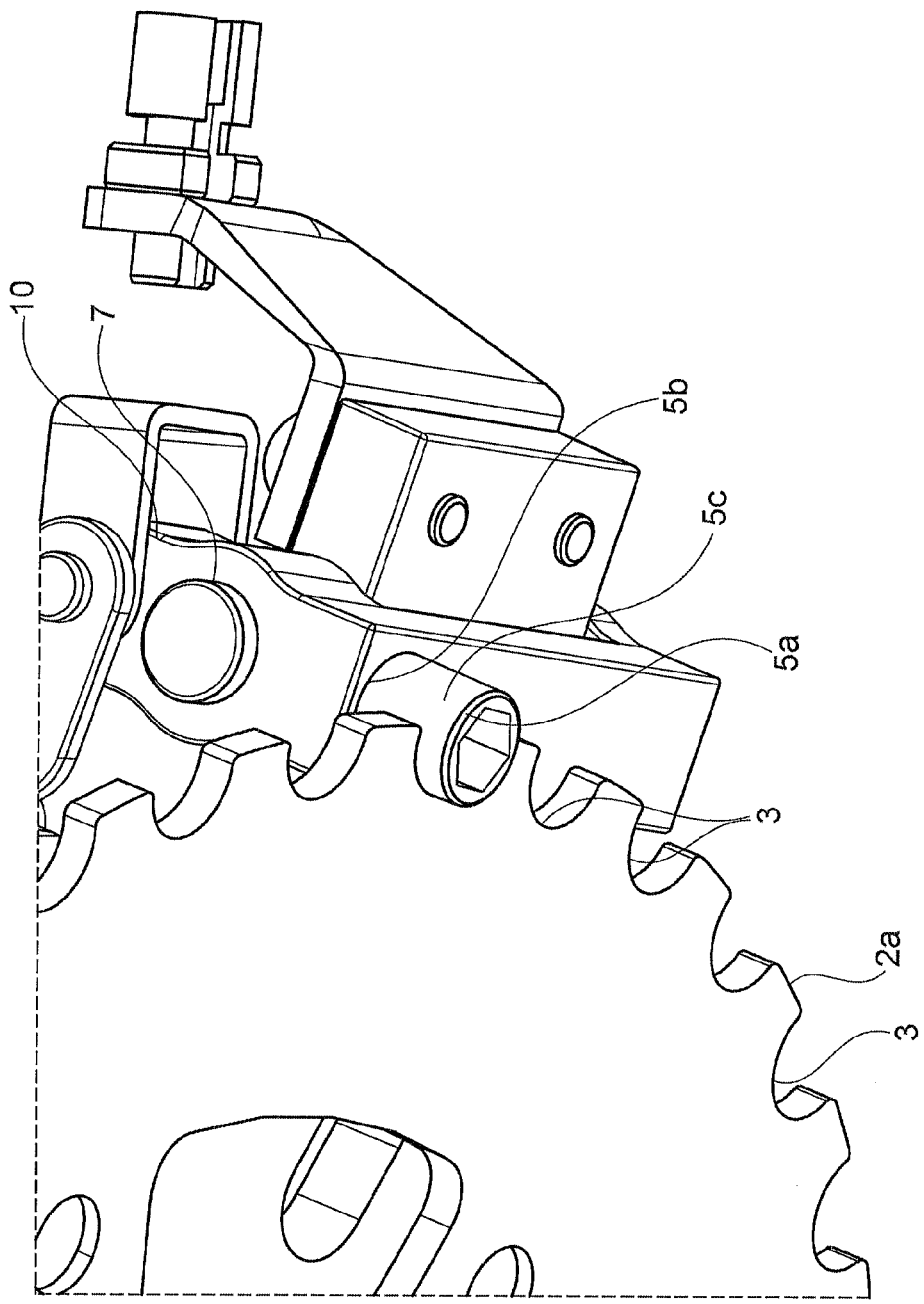

In detail, the locking means 4 comprise a pin 5 associated with disc 2. Such a pin 5 is switchable between a locking configuration and an unlocking configuration. In the locking configuration, shown in FIG. 2b, pin 5 interferes with seat 3 so as to prevent the rotation of disc 2 and, accordingly, the rotation of the wheel of the vehicle connected thereto. As shown in FIG. 2a, in the unlocking configuration, pin 5 is removed from seat 3, thus allowing the rotation of disc 2. In other words, pin 5 is in contact with disc 2 in the locking configuration, while it is separated therefrom in the unlocking configuration.

In greater detail, pin 5 can be at least partially inserted inside seat 3. In other words, pin 5 is received by seat 3, in particular in the locking configuration. In other words again, pin 5 may be accommodated inside seat 3.

Pin 5 has a rotation axis "A", and is configured to rotate with respect thereto. Thereby, pin 5 switches from the locking configuration to the unlocking configuration and vice versa by rotating on its rotation axis "A".

In particular, pin 5 has a pair of opposite ends 5a, 5b. An outer surface 5c develops between the ends 5a, 5b. A first end 5a is movable to move away from/approach disc 2, while a second end 5b is placed close to the rotation axis "A". In other words, the pin develops along a longitudinal axis "B", which passes through the ends 5a, 5b. The longitudinal axis "B" is preferably transversal, and more preferably perpendicular, with respect to the rotation axis "A". In other words, pin 5 develops away on the rotation axis "A". It is worth noting that pin 5 has a cylindrical cross section. In other words, in the preferred embodiment the outer surface 5c of pin 5 is cylindrical. Advantageously, thereby there is an optimal interaction between pin 5 and edge 2a of disc 2, because pin 5 slides inside seat 3 with the minimum friction, thus switching from the unlocking configuration to the locking configuration.

It is also worth noting that the rotation axis "A" of pin 5 is arranged on a plane parallel to the laying plane of disc 2. In an embodiment (not shown) of the invention, the rotation axis "A" of pin 5 may also be arranged transversal with respect to the laying plane of disc 2. Preferably, the rotation axis "A" of pin 5 is not perpendicular to the plane of disc 2.

Brake 1 further comprises a supporting element 6 of pin 5. In particular, the supporting element 6 is fixable to a chassis of a vehicle (not shown). By mere way of example, the supporting element 6 may be fixed to the fork of a motor vehicle.

Pin 5 may rotate with respect to the supporting element 6. In particular, a hinge 7 is arranged between pin 5 and the supporting element 6. The axis of hinge 7 defines the rotation axis "A" of pin 5.

Brake 1 comprises actuating means 11 configured to be controlled by a user so as to allow such a user to move pin 5 from the locking configuration to the unlocking configuration and vice versa.

In greater detail, the actuating means 11 comprise an arm 10 fixed to pin 5. In particular, arm 10 is arranged along the longitudinal axis "B" of pin 5. In other words, arm 10 is coaxial with respect to pin 5. It is worth noting that arm 10 is in a position opposite to pin 5 with respect to the rotation axis "A".

The actuating means 11 comprise a linkage 12 which, in the preferred embodiment, may comprise one or more cables 13. Linkage 12, and in particular the cables 13, are connected to arm 10 at a predetermined distance from the rotation axis "A" of pin 5 so as to exert an actuating motion on pin 5 through arm 10.

Figure 3A:
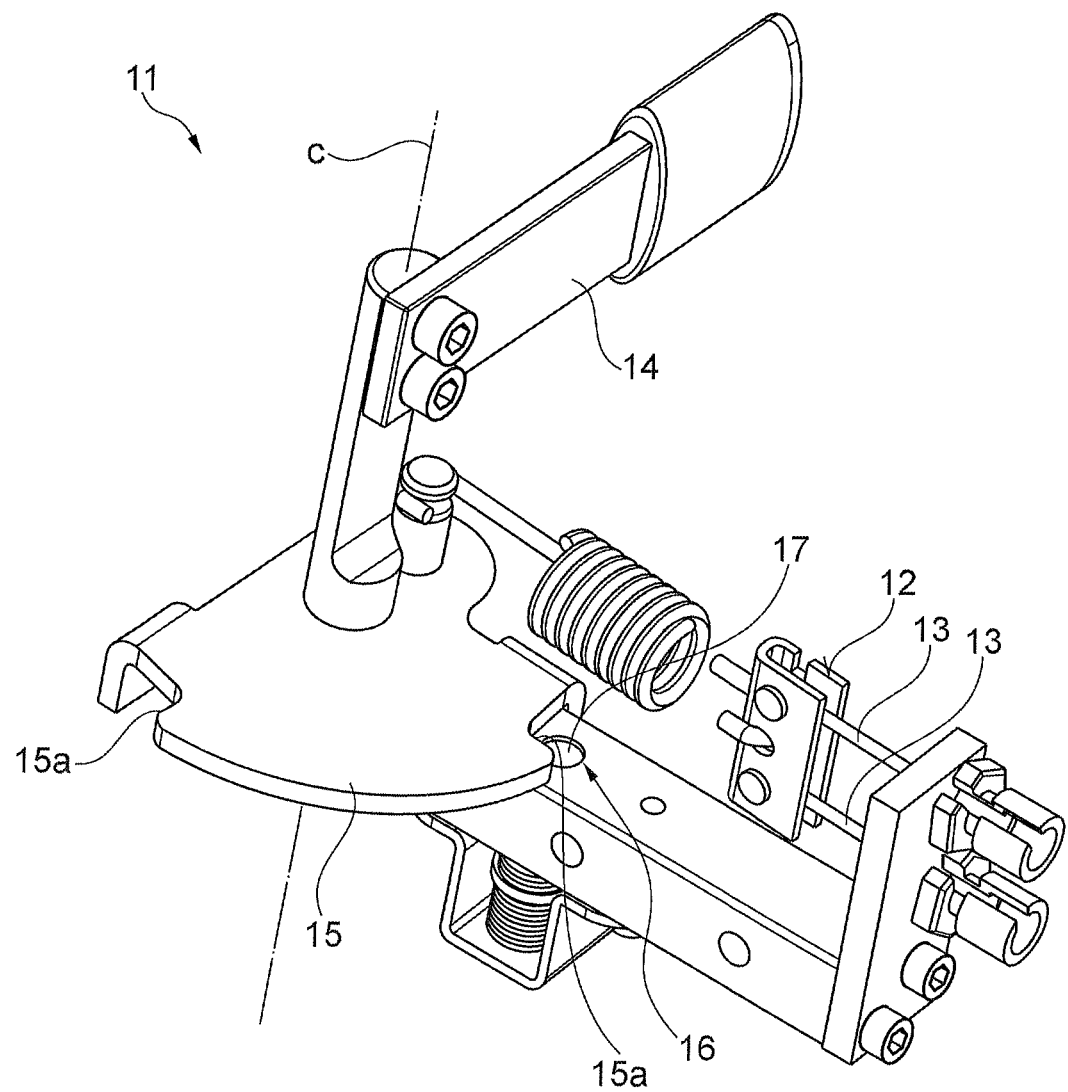
FIGS. 3a and 3b are perspective views of a detail of the parking brake in FIG. 1, in two respective operating configurations.
Figure 3B:
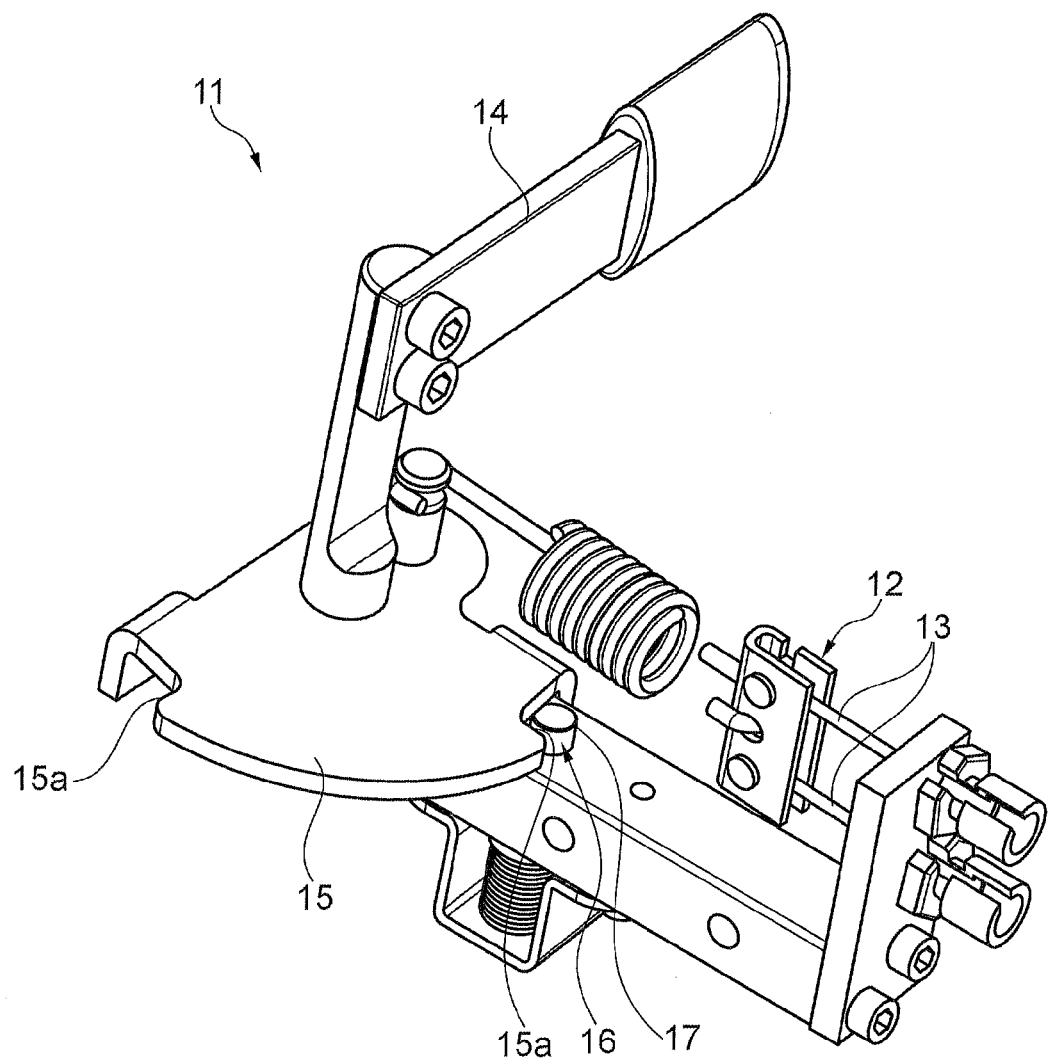

A lever 14 is connected to linkage 12, as shown in particular in FIGS. 3a and 3b. In particular, lever 14 may rotate with respect to its rotation axis "C". The actuating means further comprise a cam 15, fixed to lever 14 so as to rotate with respect to the rotation axis "C" of lever 14. In greater detail, the cam is arranged perpendicular with respect to the rotation axis "C" of lever 14. In particular, linkage 12 is fixed to cam 15 at a predetermined distance with respect to the rotation axis "C" of lever 14, so that a rotation of lever 14 with respect to its rotation axis "C" moves linkage 12. Such a linkage 12 controls pin 5 as described above.

Finally, it is worth noting that the actuating means 11 in an alternative embodiment (not shown) may also be of the electromechanical type.

Brake 1 further comprises linkage means 8 arranged between pin 5 and the supporting element 6. Such linkage means 8 are in particular configured to act at least along a direction perpendicular to the rotation axis "A" of pin 5. In other words, such linkage means 8 are configured to exert a countering action with respect to the action of the actuating means 11 described above. In even greater detail, the linkage means 8 are connected to pin 5 at a predetermined distance from the rotation axis "A", so as to exert a linkage motion on pin 5 which tends to bring it from the locking configuration to the unlocking configuration. Accordingly, it is necessary to exert a predetermined force to bring pin 5 into locking configuration. Advantageously, thereby an accidental or inhomogeneous actuation of brake 1 is prevented.

In the preferred embodiment, such linkage means 8 are of elastic type. In alternative embodiments (not shown), the linkage means 8 may be of any type, e.g. electromechanical.

In greater detail, the linkage means 8 comprise a spring 9 fixed to pin 5. Such a spring 9 has a pair of ends 9a, 9b. A first end 9a is connected to the supporting element 6, while a second end 9b is connected to pin 5.

Brake 1 further comprises a safety device 16, which is enabled on the actuating means 11, in particular on cam 15. In greater detail, cam 15 has at least a side 15a. The safety device 16 comprises a further pin 17 configured to interfere with said at least a side 15a of cam 5 and, accordingly, prevent the rotation of cam 15 and the actuation of pin 5.

Preferably, said cam has two sides 15a adapted to interfere with said further pin 17. In particular, the further pin 17 may switch from a locking configuration to an unlocking configuration and vice versa. In the unlocking configuration, shown in FIG. 3a, the further pin 17 is retracted, and cam 15 is free to rotate with respect to rotation axis "C" of lever 14, thus allowing the actuation of brake 1. In the locking configuration, shown in FIG. 3b, the pin interferes with one of the sides 15a of cam 15, so as to prevent the rotation thereof, thus preventing the user from enabling or disabling brake 1, according to which of the two sides 15a is engaged by said further pin 17. Advantageously, the further pin 17 may be actuated by a key (not shown), so as to perform the function of anti-theft device and/or safety device, thus allowing the key to be removed from the instrument panel only provided that the parking brake is properly engaged.

When the user wants to intervene on the actuating means 11, in particular on lever 14, to release the parking brake 1, this will be possible only if the user has inserted and unlocked, when necessary, the further pin 17 by means of the ignition key, and the same further pin 17 will interfere with the other side 15a to ensure that, during running, cam 15 and therefore the actuating means 11 are locked in the unlocking position of pin 5.

The present invention achieves the objects proposed as discussed above, to which significant advantages are added.

In particular, the disc is configured to operate as a disc of a braking system of a vehicle. Accordingly, a calliper (not part of the present invention) may act on the disc during the running of the vehicle to brake the wheel to which the disc is fixed.

Furthermore, the seats formed on the edge of the disc allow using the same as a "phonic wheel", thus using a sensor located on the side of the disc capable of detecting the passing of the seats. It is possible to trace the rotation speed of the disc and, accordingly, the speed of the vehicle from the number of seats that pass at the sensor in the unit of time.

The invention claimed is:

1. Parking brake comprising a disc coaxially fixable to the wheel of a vehicle and having an edge; locking means associated with said disc for preventing the rotation of said disc; characterized in that said disc has at least a seat formed on said edge; said locking means comprising a pin associated with the disc and switchable between a locking configuration in which said pin interferes with said seat to prevent the rotation of said disc, and an unlocking configuration in which said pin is removed from said seat to allow the rotation of said disc;

wherein said pin has a rotation axis arranged on a plane parallel to the plane of said disc, said pin being configured for rotating with respect to said rotation axis in order to reversibly switch from said locking configuration to said unlocking configuration, wherein said pin develops along a longitudinal axis perpendicular to said rotation axis between a second end close to said rotation axis and a first end opposite to said second end and wherein with said pin in said locking configuration said first end interferes with said seat.

2. Parking brake according to the preceding claim, characterized in that said pin can be at least partially inserted inside said seat.

3. Parking brake according to claim 1, characterized in that it comprises a supporting element of said pin, said supporting element being fixable to a chassis of a vehicle, said pin being rotatable with respect to said supporting element by means of a hinge arranged between said pin and said supporting element.

4. Parking brake according to claim 3, characterized in that it comprises linkage means arranged between said pin and said supporting element.

5. Parking brake according to claim 4, characterized in that said linkage means are configured for acting at least along a direction perpendicular to said rotation axis.

6. Parking brake according to claim 1, characterized in that said disc is a brake disc of a braking system of a vehicle.

7. Parking brake according to claim 1, characterized in that said edge of said disc has a profile having a plurality of ridges and valleys, each valley defining a respective seat for said pin, said ridges and/or said valleys being preferably portions of a circumference.

8. Parking brake according to claim 7, characterized in that said pin has a cylindrical cross section.

\* \* \* \* \*